(12) United States Patent
Reiser et al.

(10) Patent No.: US 6,316,079 B1
(45) Date of Patent: Nov. 13, 2001

(54) PLASTIC FILM

(75) Inventors: Rolf Reiser; Kurt Springer, both of Forchheim (DE)

(73) Assignee: 4P Folie Forchheim GmbH, Forchheim (DE)

( * ) Notice: Subject to any disclaimer, the term of this patent is extended or adjusted under 35 U.S.C. 154(b) by 0 days.

(21) Appl. No.: 09/057,234

(22) Filed: Apr. 8, 1998

(30) Foreign Application Priority Data

Apr. 15, 1997 (DE) .................................. 197 15 656

(51) Int. Cl.$^7$ ....................................................... B32B 3/00
(52) U.S. Cl. ............................................ 428/156; 428/167
(58) Field of Search ................................ 428/156, 172, 428/187, 212, 141, 407, 167

(56) References Cited

U.S. PATENT DOCUMENTS 4,376,147 * 3/1983 Byrne et al. .................... 428/156

FOREIGN PATENT DOCUMENTS

WO90/02658 * 3/1990 (GB) .

* cited by examiner

*Primary Examiner*—Donald J. Loney
(74) *Attorney, Agent, or Firm*—Collard & Roe, P.C.

(57) ABSTRACT

A plastic film, in particular a polyolefin film, having an embossed surface. The film is provided with two superimposed embossing patterns, one of these embossing patterns being comparatively coarse and resembling linen, while the second embossing pattern is finer and gives the film surface a matt appearance. Both embossing patterns have an embossing depth of about 50 to 100$\mu$ and preferably 50 to 60$\mu$ with a film thickness of about 20 to 25$\mu$.

5 Claims, No Drawings

PLASTIC FILM

SUMMARY

Plastic Film

Plastic film, in particular a polyolefin film, that is provided with an embossed surface which consists of two superimposed embossing patterns, one of these embossing patterns being comparatively coarse and resembling, for example, linen, while the second embossing pattern is finer and gives the film surface a matt appearance.

DESCRIPTION

Plastic Film

The invention relates to a plastic film, in particular a polyolefin film, that is provided with an embossed surface.

Particularly when they are used as diaper films, plastic films are supposed to have the appearance of textiles while maintaining the favourable properties of the plastic film at the same time.

The purpose of the invention is to treat a plastic film in such a way that it has a textile appearance.

In the solution to this problem proposed by the invention, the film is provided with two superimposed embossing patterns, one of these embossing patterns being comparatively coarse and resembling, for example, linen, while the second embossing pattern is finer and gives the film surface a matt appearance.

Both comparatively coarse and fine embossing patterns have been disclosed in practice, but neither of them has succeeded in satisfying the requirements made.

It has only proved possible to achieve the desired effect by combining both of the embossing patterns.

In an advantageous further development of the invention, the first, coarse embossing pattern has regular embossed lines or interrupted lines.

It is very advantageous in this context if in accordance with another further development of the invention the second, finer embossing pattern has a diamond shape.

The combination of these two embossing patterns leads to the production of a diaper film that has a character that is similar to cloth.

In accordance with another further development of the invention, the finer embossing pattern can, however, also be produced by embossing the film with a ceramic-coated embossing roller.

It has proved to be very advantageous here if in accordance with another further development of the invention both embossing patterns have an embossing depth of about 50 to $100\mu$ and preferably of 50 to $60\mu$ with a film thickness of about 20 to $25\mu$.

As a result of these measures it is pratically impossible to distinguish the film visually from a textile material.

When the diaper film is being manufactured in accordance with the invention, a polyolefin film 20 to $25\mu$ thick is produced first of all which is then embossed. Both of the embossing patterns, i.e. a comparatively coarse embossing pattern with a linen appearance and a finer embossing pattern with a diamond shape, are embossed in the film at the same time. Both of the embossing patterns have an embossing depth of about 50 to $60\mu$. The finer embossing pattern can also be produced with the help of an embossing roller that has a ceramic-coated surface.

What is claimed is:

1. Plastic film that is provided with an embossed surface, wherein the film is provided with two superimposed embossing patterns over the entire surface of the film, one of these embossing patterns being comparatively coarse and resembling linen, while the second embossing pattern is finer and gives the film surface a matt appearance, wherein both embossing patterns have an embossing depth of about 50 to $100\mu$, with a film thickness of about 20 to $25\mu$.

2. Plastic film according to claim 1, wherein the first, coarse embossing pattern has regular embossed lines or interrupted lines.

3. Plastic film according to claim 1, wherein the second, finer embossing pattern has a diamond shape.

4. Plastic film according to claim 1, wherein the finer embossing pattern is produced by embossing the plastic film with a ceramic-coated embossing roller.

5. Plastic film according to claim 1, wherein both embossing patterns have an embossing depth of about 50 to $60\mu$.

* * * * *